(12) United States Patent
Andrzejewski

(10) Patent No.: US 11,978,369 B2
(45) Date of Patent: May 7, 2024

(54) DISPLAY HANGING SYSTEM, APPARATUS AND METHOD

(71) Applicant: Jarek Andrzejewski, Brookfield (AU)

(72) Inventor: Jarek Andrzejewski, Brookfield (AU)

( * ) Notice: Subject to any disclaimer, the term of this patent is extended or adjusted under 35 U.S.C. 154(b) by 0 days.

(21) Appl. No.: 16/760,876

(22) PCT Filed: Oct. 29, 2018

(86) PCT No.: PCT/AU2018/051162
§ 371 (c)(1),
(2) Date: Apr. 30, 2020

(87) PCT Pub. No.: WO2019/084598
PCT Pub. Date: May 9, 2019

(65) Prior Publication Data
US 2021/0174708 A1     Jun. 10, 2021

(30) Foreign Application Priority Data
Oct. 30, 2017 (AU) .................. 2017904404

(51) Int. Cl.
*G09F 7/20*     (2006.01)
*A47F 10/00*     (2006.01)
(Continued)

(52) U.S. Cl.
CPC ............... *G09F 7/20* (2013.01); *A47F 10/00* (2013.01); *F16G 11/105* (2013.01);
(Continued)

(58) Field of Classification Search
CPC ... G09F 7/18; G09F 7/20; G09F 7/205; G09F 15/00; G09F 15/0025; G09F 15/0087;
(Continued)

(56) References Cited

U.S. PATENT DOCUMENTS 4,662,628 A * 5/1987 Chatenay epouse Compagnone .......... A63J 1/028 254/278
6,464,190 B1 * 10/2002 Aramaki ................. F21V 21/38 248/327

(Continued)

FOREIGN PATENT DOCUMENTS

BG    2534891 A    8/2016
CA    2477042 A1    2/2006
(Continued)

OTHER PUBLICATIONS

International Search Report and Written Opinion in related International application No. PCT/AU2018/051162, dated Feb. 15, 2019, 9 pages.

(Continued)

*Primary Examiner* — Cassandra Davis
(74) *Attorney, Agent, or Firm* — Law Office of Jeff Williams PLLC; J. Oliver Williams

(57) ABSTRACT

The invention provides method and apparatus for raising a display poster to an overhead position for viewing by persons passing below. The apparatus comprises a motorized winder remotely controllable to cause take-up and paying out of first and second separate cords distally connected to an overhead supporting structure. The motorized winder is contained within a housing having a lower receiving space into which an edge adjacent portion of a poster to be displayed in a retailing or similar environment is receivable for clamping in place against removal by clamping means preferably comprising an elongate roller. The apparatus contains a formation for inhibiting rolling of the roller when in entrapment position.

4 Claims, 3 Drawing Sheets

(51) Int. Cl.
  *F16G 11/10* (2006.01)
  *F16M 11/24* (2006.01)
  *F16M 13/02* (2006.01)
  *G09F 17/00* (2006.01)
  *G09F 7/18* (2006.01)

(52) U.S. Cl.
  CPC .......... *F16M 11/24* (2013.01); *F16M 13/027* (2013.01); *G09F 17/00* (2013.01); *G09F 2007/1843* (2013.01); *G09F 2007/186* (2013.01); *G09F 2017/0025* (2013.01); *G09F 2017/0041* (2013.01)

(58) Field of Classification Search
  CPC ............... G09F 17/00; G09F 2007/186; G09F 2007/1843; G09F 2017/0025; G09F 2017/0041; G09F 2007/18; B65H 75/446; B65H 75/4471; B65H 75/4486; F16M 13/027; F16M 11/24; F16G 11/105; A47F 10/00
  USPC ............... 248/327, 328, 329, 332, 320, 317; 254/4 R, 134
  See application file for complete search history.

(56) References Cited

U.S. PATENT DOCUMENTS

| | | | | |
|---|---|---|---|---|
| 7,249,743 | B1* | 7/2007 | Stearns | A47F 5/0892 248/329 |
| 7,373,748 | B2* | 5/2008 | Pitcher | G09F 7/00 24/462 |
| 7,743,541 | B2* | 6/2010 | Suciu | G09F 7/18 40/658 |
| 2003/0024892 | A1 | 2/2003 | Macsenti | |
| 2017/0053569 | A1 | 2/2017 | Votolato | |

FOREIGN PATENT DOCUMENTS

| | | |
|---|---|---|
| EP | 0935228 A1 | 8/1999 |
| FR | 2741985 A1 | 6/1997 |

OTHER PUBLICATIONS

International Preliminary Report on Patentability in related PCT app No. PCT/AU2018/051162, dated Jun. 14, 2019, 4 pages.

* cited by examiner

DISPLAY HANGING SYSTEM, APPARATUS AND METHOD

FIELD OF DISCLOSURE

This disclosure relates to the overhead hanging of vertically displayed materials such as banners, pennants and posters. The disclosure includes both a method of suspension and apparatus for lowering and raising a display item. It may be implemented in concourses, exhibition halls, shopping malls, sports arenas and similar environments where floorspace below needs to be kept unobstructed for human movement.

BACKGROUND

Poster and banner suspension systems of various kinds are known. A significant operating cost borne by commercial operators occupying voluminous spaces, such as malls, warehouse stores and other locations, is that of changing their overhead promotional, marketing and advertising materials. The spaces they occupy typically have lofty ceilings from which these display items are suspended for visibility, while not interfering with the movements of customers and staff. Occasionally, actual merchandise may be suspended for view and promotion. In some work areas, there is a need to hang information boards above work spaces and assembly areas to avoid disruption of work activities. To install and remove or replace for updating these items, employees find themselves needing to scale a ladder or other similar apparatus to take down the displayed item. Workplace regulation places increasing requirements on certification of workers to work at the heights required for these activities. To arrange for the qualified personnel to be available adds further administrative burdens.

An aspect of the present disclosure will allow personnel to avoid having to work at heights by allowing the replacement and lifting of display items without leaving the floor. In this connection, U.S. Pat. No. 9,691,304 (to Votolato) provides a device for successively changing elongated flexible objects such as hanging posters from an active viewable position to a non-active, non-viewable position. It includes a rotatable drum to which the flexible objects are attached, a motor that rotates the drum in reversible directions, and a controller unit controlling motor speed and direction. A balancing spring is preloaded when the flexible objects are unwound from the drum, providing a lifting force when the flexible objects are wound up on the drum. By using a freewheeling clutch, preloading only occurs in one rotational direction, the balancing spring freewheeling in the other direction, taking no load. Utilizing a magnetically interactive identification strip the device gains highly accurate information on the position of the flexible elongated objects. The housing for the motor also includes second hanging structures for connecting to a display bar for suspending a planar display item such as a poster or similar display, that may be prone to undesirable bending. A drawback of this patent is that its invention caters for flexile objects only and not for more rigid materials, such as polystyrene-backed posters or cardboard display boards.

A drawback, however, is that the Votolato disclosure does not disclose means for orienting a hanging display when the support from which it is suspended is not substantially horizontal. This can be related to the apparatus comprises a single cord interacting with the pulley system. Another drawback is the risk of injury to persons below the suspended display in the event of failure of the cord.

U.S. Pat. No. 4,662,628 discloses a scenery lifting system for lowering scenery into view on a theatre stage or lifting scenery out of view. The system has a separate motorized winder dedicated to each of a pair of cords from which a hanging unit is suspended. The motors provide synchronized winding and unwinding, using the cords as conduction pathways for electricity to the motors. The invention disclosed is not concerned with detaching a scenery item during a live show, but with having a series of units from which different sets of scenery backgrounds are suspended continuously out of view and are lowered and raised as scene changes occur during a live performance of a theatre production.

British patent publication GB 2,534,891 describes an invention that may be used with a floor-standing display, known as a "banner stand". It does not contemplate the unit that holds on to the top edge of the display sheet being suspended and raised or lowered. It has a releasable locking arrangement for holding the top edge of a display, provided that the top edge is first secured to a mounting plate. Because of the use of the mounting plate, the top portion of the display sheet has to be slid laterally into a receiving slot in the holding unit, referred to as a "support rail assembly". This system is not suitable for insertion of just the top edge of a poster until it is clamped. Instead, it requires temporary removal of one of the end caps of the support rail unit to allow insertion of the poster mounting plate, followed by replacement and securing of the end cap. This is cumbersome. It is also unnecessary when hanging light-weight displays. Use with a motor driven lifting means is not contemplated.

Canadian patent application, CA 2477042, focuses on releasable holding means for retaining a display sheet in a suspensible unit for the retailing industry. It provides for clean insertion of the naked edge of the display sheet material from below a receiving slot. Once the edge portion has entered within the slot, a clamping device holds it in place against falling out. The clamping device has a snap mechanism that clamps a poster sheet in place. It is not concerned with the lowering and raising of the poster hanging unit.

US patent application publication 2003/0024892-A1 illustrates a banner display holder having a gripper roller that bears under gravity against a peripheral portion of a display sheet, clamping it against a movable wall of a housing. The roller has a fluted surface with flexible flutes that bend flexibly against the sheet surface to enhance gripping force for heavy displays, when pushed down towards the bottom of the cavity within which the sheet is received.

The preceding discussion of the background is intended to facilitate an understanding of the present disclosure. However, it should be appreciated that the discussion is not an acknowledgement or admission that any of the material referred to was part of the common general knowledge in Australia or elsewhere as at the priority date of the present application.

Further, and unless the context clearly requires otherwise, throughout the description and the claims, the words 'comprise', 'comprising', and the like are to be construed in an inclusive sense—that is to say, of "including, but not being limited to"—as opposed to an exclusive or exhaustive sense, meaning "including this and nothing else".

SUMMARY OF DISCLOSURE

According to a first aspect of the present disclosure, there is provided a poster hanging system comprising:
a. a suspensible unit including:
   i. powered cord-winding means comprising a single motorized winder operable to wind both cords simultaneously;
   ii. display holding means adapted for receiving into the unit an upper unmounted edge and peripheral adjacent portion of a display sheet; and
   iii. releasable locking means operable to retain said portion when received, so that in use the sheet hangs from the unit in display orientation;
b. suspension means comprising a pair of cords having first and second opposite ends and being secured at their respective first ends to the winding means, and at their distal, second ends to a support structure; and
c. remote control means by which the winding means is operable for releasing and winding the cord at least partially from and into the unit, whereby the unit is suspensible at a selectable level below the support structure.

In a preferred form of the system, the cords are adjustable in suspension length to allow orientation of the unit at a user-selectable angle of inclination to the ground below.

The system in an embodiment comprises orientation adjustment means associated with each cord, operable for causing the unit to be suspended at a user-selected orientation relative to the supporting structure.

Preferably, the orientation adjustment means is operable for causing each cord to have a selected length between the unit and the supporting structure.

In a preferred embodiment, the orientation adjustment means comprises a cord locking device. The cord locking device is operative to prevent cord slippage though it when in locked mode.

Preferably, the cords are connected to the supporting structure via the cord locking device.

In a still further preferred embodiment, the winder comprises a motor-driven spooling mechanism.

The spooling mechanism preferably comprises respective spools for receiving and releasing the respective cords. The spooling mechanism comprises a rotatable drive-shaft, directly connecting said spools to the motor.

In an embodiment of the system, the winder is operable for releasing and winding the cords independently from and into the unit.

In a preferred embodiment, the hanging unit comprises a power source on board. It is preferred that the power source is mounted for even distribution of its weight between the ends of the unit, within a housing defining the extent of the unit.

By way of example, the power source comprises a battery located in power-sourcing relationship with the motor.

Yet further, in an embodiment, the display holding means comprises a housing defining a bounded receiving space within, the housing comprising a wall and moveable entrapment means positioned within the space to entrap a display sheet portion against said wall when inserted into the space.

Preferably, the entrapment means has a slip-resistant surface, against which a portion of the display sheet abuts in use, thereby helping to hold it in suspended orientation.

Further preferably, the locking means includes spring biasing means constantly urging a locking element against the entrapment means and the entrapment means against a first side of the wall.

In a still further preferred form, the display hanging system comprises release means operable to act against the biasing means to reduce the trapping force exerted against the entrapment means.

The release means preferably comprises a lever pivotally connected to a second side of the wall at a location opposite to the first side.

The gap between the first and second sides is preferably sized too large for the entrapment means to pass through.

In a preferred embodiment, the entrapment means comprises an elongate roller.

According to a second aspect of the disclosure, a display hanging system comprises:
a. a suspensible unit comprising cord-winding means having a single driving motor and display attachment means, by which a display sheet is attachable, so that in use it hangs therefrom in display orientation;
b. a pair of cords attached to the cord-winding means and arranged to suspend the unit from a supporting structure in operative orientation; and
c. remote control means by which the winding means is operable for releasing and winding each cord at least partially from and into the unit,
wherein the display attachment means comprises
   i. a space for receiving therein an edge-adjacent portion of a display sheet to be suspended, the space being bounded by a wall,
   ii. trapping means comprising a moveable body unsecured within the space, for trapping a display sheet portion, when inserted in the space between the body and the wall, against removal, and
   iii. releasing means operable to release the sheet portion from the trapping means for removal from the space.

In a preferred embodiment, the trapping means comprises urging means configured to force the body constantly against the sheet portion when interposed, and urge it against the wall, to resist withdrawal from entrapment within the space.

In a preferred embodiment, the body comprises a roller.

In a further preferred embodiment, the urging means comprises a spring.

In the display hanging system, the releasing means may act on the urging means to reduce the force it applies against the trapped display sheet.

According to a third aspect of the disclosure there is provided a method of elevating an object for display to an overhead hanging location, the method comprising the steps of:
a. Providing a system in a form as described above,
b. Installing the suspensible unit to depend from a supporting structure by respective first and second cords,
c. Locking the cords to provide a selected length for each to extend from the unit to the supporting structure, and
d. Attaching an object for display to the unit and elevating the unit, with the object attached, to a level suitable for suspending the object for display.

According to a fourth aspect of the disclosure there is provided a method of suspending a display sheet from an overhead support structure, the method including
a. providing a housing having:
   i. a space inside into which an edge-adjacent portion of a display sheet to be suspended is receivable thought an elongate gap;
   ii. unattached entrapment means within the space, moveable to entrap the display sheet portion within the space; and iii. a motorized winding mechanism mounted therein;
b. inserting said edge-adjacent portion of a display sheet into the space via the gap;
c. causing the entrapment means to move to a position where it traps the sheet portion against a housing wall defining the space;
d. releasably locking the entrapment means in said position;
e. providing a pair of cords and attaching a first end of each cord to the winding mechanism and a second end of each respective cord to the support structure; and
f. raising the housing to an elevated display position above head height, for enabling viewing of the display sheet from a relatively lower location, by operating the winding mechanism to wind the cord.

The winding mechanism may be operable by a remote control device and the method includes providing and operating the remote control device to raise or lower the housing.

In an embodiment, the method includes adjusting orientation of the housing to a selected angle of orientation to the ground below or the supporting structure.

The method may include operating releasing means to release the display sheet for replacement with another.

The winding mechanism may comprise a single driving motor.

Further details of embodiments of the disclosure will be described in the pages to follow, wherein reference is made to the accompanying drawings.

BRIEF DESCRIPTION OF DRAWINGS

In order that the disclosure may be readily understood, and put into practical effect, reference will now be made to the accompanying figures. Thus.

DETAILED DESCRIPTION OF EMBODIMENTS

Figure 1:
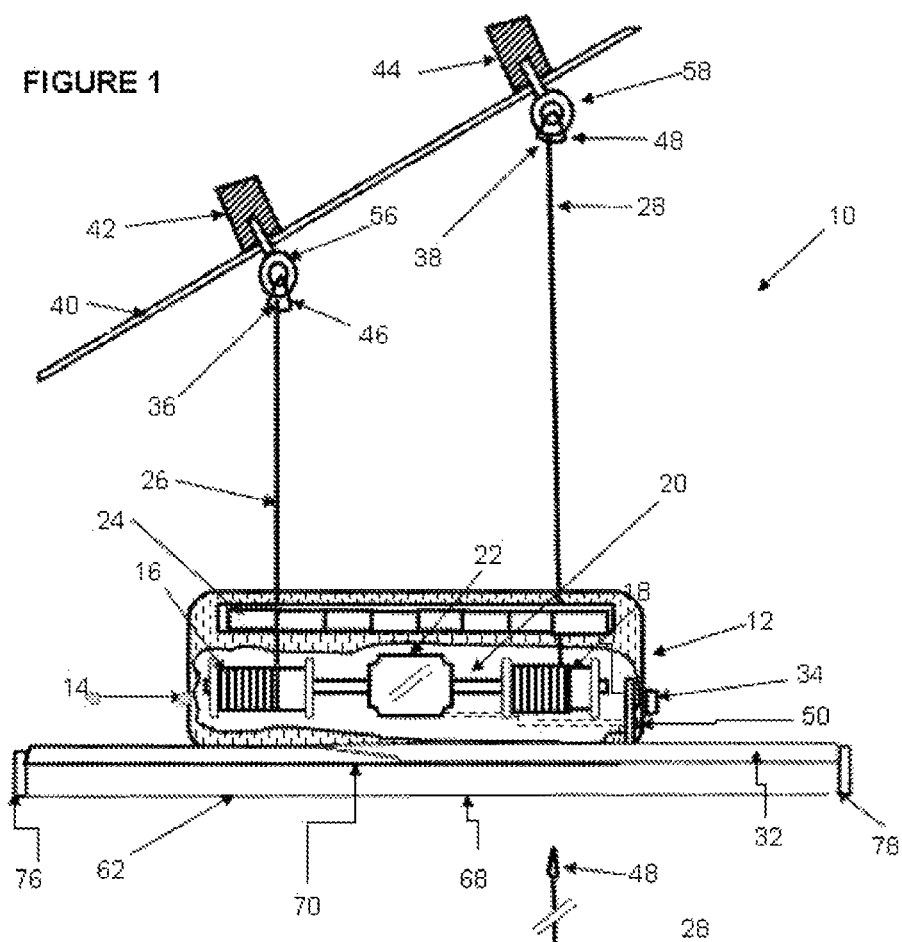
FIG. 1 shows in schematic, partially cut-away side view, a preferred embodiment of the hanging system of this disclosure.
Figure 2:
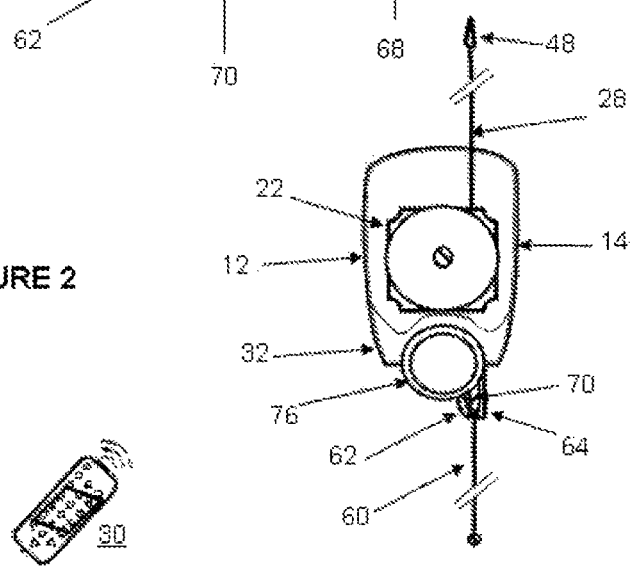
FIG. 2 is a schematic end view, partially cut away, of the embodiment of FIG. 1.

Referring to FIGS. 1 and 2, which illustrate schematically a preferred embodiment of this disclosure, a hanging system for a visual display in sheet form is generally denoted by the number 10 and shown supported from a sloping structure 40.

Preferably, the system 10 initially arrives in kit form, ready for deployment. The kit contains a suspensible unit 12 having a hollow upper housing 14, which is disengageably connected with a lower, hull portion 32.

Inside the upper housing are installed motor-driven take-up spools 16, 18. These are connected to a drive shaft 20 driven by a winding motor 22 of conventional design. Cords 26, 28 are supplied secured to and almost completely wound about respective take-up spools 16, 18, except for their respective free ends 36, 38, which are exposed and accessible for connecting to cord locks 46, 48. The cords in this embodiment are made of nylon, but it will be appreciated that other materials may be substituted within the scope of this disclosure. The cord locks are of conventional automatically locking design, a suitable example being the CAM-JAM® XT™ ALUMINUM CORD TIGHTENER, available online via the website http://www.niteize.com/product/CamJam-Mini-Cord-Tightener.asp.

The cord locks enable the cords to be set according to the length required for suspension. This is particularly advantageous when the supporting structure is inclined away from the horizontal or the anchor points are on an uneven or non-planar surface, for example the roof of a cavern, or of a shopping mall having an architecturally designed roof configuration. The angle of inclination of the unit may be adjusted by conventional means, for example a spirit level, which may be attached to the housing, or a gyroscopic function app running on a smart phone. Use of the latter enables the unit to be suspended at any required angle by releasing and locking the automatic cord locks.

The cord locks are paired with connection eyes 56, 58, which are intended for fastening to the overhead supporting structure from which the system will be operatively suspended. Power for the motor is sourced from a battery pack 24 mounted centrally within an upper cavity in housing 14, above drive shaft 20. This location helps provide balance and stability, not only when the unit is being raised and lowered, as will be described below, but also when it is in operative suspended position. This provides an advantage over prior systems in which stability and orientation of the suspended display item are known issues, which arise largely from off-centre upper radial and axial weight distribution leading to uneven hanging performance.

The battery pack in this embodiment comprises 8 AA-size cells rated at 1.5V each, but may comprise a larger number or a different rating in other embodiments, according to the power requirements of load to be driven. The battery pack may alternatively be assembled to provide 12V DC or 24V DC, depending on motor requirements. An advantage of using a battery-operated system for this embodiment is the ease and cost of installation: There is no need for summoning a licensed electrician to install a mains power outlet to power the motor, for example from within a ceiling cavity or other elevated roof-related area. All that is needed is to have two fixing points from which to suspend the unit. Depending on the make of manufacture and model of the cells used, these are found to be adequate for operating motor 22 for 80 full operating cycles (that is unwinding and winding up the cords from the spools 80 times before scheduled replacement). The battery cells in the pack may be of the rechargeable type and to cater for their recharging, a photovoltaic cell array may be mounted on the outer side of housing 14.

The unit preferably includes a light emitting diode 34, visible on the exterior of housing 14 to serve as a battery power indicator and to signal, by emitting a red light, when the charge is reaching a level barely adequate of performing another two cycles. It is not a critical feature of this disclosure when exactly the low charge warning is emitted, provided there is sufficient charge left to recover the unit by causing it to be controllably lowered to come within reach of the operating personnel. The system controller (discussed below) may be programmed to emit the signal at another time or charge condition, depending on user or manufacturer requirements or preferences.

The kit may further contain a hand-held remote-control device 30, which is manufactured and configured using components known in the art, including a programmable microchip and short range wireless communications hardware and software. The microchip is programmable to control a plurality of suspension motors. Therefore, the remote controller need not be included in each kit, or even in any kit at all, but may be supplied separately for use independently or simultaneously for selectively controlling multiple motors. The remote-control unit in the preferred embodiment of the disclosure has a digital display screen showing a plurality of working channels related to respective display motors capable of being controlled by it.

Remote control may alternatively, or in addition, be achieved by means of a software application being run on a computer device, preferably a mobile device such as a mobile telephone handset with a touchscreen. However, the application may be operated on a tablet computer or wearable communications device, as well as on a notebook or desktop computer.

When deploying the system in a concourse, mall, warehouse, store or the like, in which the supporting structure, such as a ceiling or roof-supporting beam is at an inconvenient access height, a user who has identified where the hanging display is to be positioned, affixes to the support structure the connecting fastener, such as a hanging eyebolt or anchor hook 56, 58. To do this may require use of scaffolding or an extension ladder, extensible working platform or cage or other equipment used for working at heights. This provides a permanent hanging facility that will be reusable for changes of display from time to time. The system provides for the changing of the display without again having to revisit the connecting fastener, except as may be necessary for safety inspections, routine maintenance and the like.

Once the connecting fasteners 56,58 are suitably anchored in the desired location on the supporting structure, shown in FIG. 1 to be a sloping ceiling 40, supported from parallel beams 42, 44 in the ceiling cavity, they are ready to receive the remote ends of the cords via the connecting rope locks. The user prepares the cord ends by securing them to the rope locks by conventional securing methods.

At this stage of the installation process, the cords may be substantially completely taken up on the respective spools 16,18. In this case, the human installer of the system will need to bring the unit 12 with him, when ascending to the location of the beams 42, 44 to which the connecting fasteners 56, 58 will have been secured.

Alternatively, the installer may choose to pay out the cords sufficiently to reach the beams and fasteners while the unit is left on the floor, or a lower support structure such as a table or rack of shelves, or in the hands of an assistant. Local industrial safety regulations may dictate the option to be employed. It will be appreciated that the housing and its components will be selected to be of suitably low weight materials for ease of portage, while providing positional stability when suspended, despite drafts of air from time to time.

Once a unit 12 has been appropriately assembled, installed and is suspended at the chosen angle in relation to the ceiling or other support structure, a user desirous of suspending a selected display sheet operates remote-control 30 to select the unit in question for its motor to be operated. The user selects the unit to be paired with the controller, by tapping allocated control buttons on a touch display of the controller, causes communication between the chip within and a remote chip 50, which is controllingly associated with motor 22. Chip 50 is programmed to respond to commands received from the remote-control chip and co-ordinate release or take-up of cords 26, 28.

In the case where the cords are in taken-up configuration on the spools, the user will operate the remote-controller to issue commands for causing unit 12 to descend under gravity to a height approaching the user. With the unit in lowered position, the user obtains the sheet for suspended display 60, and secures it to housing 14.

Securing the display sheet to the unit in the present embodiment is by way of trapping the sheet between a moveable, spring-biased roller jaw that rests between side wall portion 62 and thrust plate 64, straddling a display sheet-receiving gap between them. The assembly is described in further details with reference to FIG. 4.

Wall portion 62 is detachably connected to hull portion 32 of unit 12. A silicone-covered rod-like roller (or having an alternative slip-resistant surface coating) 70 lies above a retaining formation between panels 62, 64. The rod is rounded in cross-section and has a diameter greater than the largest extent of the jaw gap. By pivoting a lever, described in relation to FIG. 4, the user is able to act against the spring biasing of the jaw roller 70 and pivotally displace it from its default abutment with plate 64. This widens the small gap between roller and panel 64 so that a peripheral portion of the display sheet to be exhibited can be slid between them before the jaw roller is again forced to close on it by releasing the thumb lever. By tilting the unit axially with the rod axis, the rod is caused to move away from the gap, allowing for easier insertion of the display sheet. When enough of the sheet has been inserted, the unit can be allowed to return to its operative orientation. The rod rolls down to the lowest point it can reach adjacent the gap between the jaws. This action ensures the inserted portion of the display sheet is held against the silicone retaining rod to provide further means to prevent its slipping out. End caps 76, 78 prevent the rod roller from falling out of the unit, in the event it is tilted to far from the horizontal.

To replace the display sheet or adjust its orientation or elevation level, the user simply lowers the unit 12, eases open the gap between plates 62,64 using the thumb heels and removes, replaces and realigns the display sheet at the required angle in relation to the unit. As the unit will already have been suspended at a selected angle to the roof or supporting structure using auto-locking cord locks, as previously discussed, it would usually not require adjustment.

When the display sheet has been set in place within the retaining assembly, the user can manipulate unit 12 to the required level using the remote control 30 to communicate with the motor 22 and to rotate shaft 20, so that take-up spools 16, 18 will wind in the respective cords 26, 28 in unison, thereby raising the housing and the display sheet depending below it to the required height selected by the user. Having set the cord lengths to be utilised in lifting by way of activating the cord locks, and since the layouts of commercial business spaces rarely change structurally, the need for climbing up to the ceiling 40 to change the display sheet location by relocating the roof anchors will likely arise very infrequently.

Figure 3:
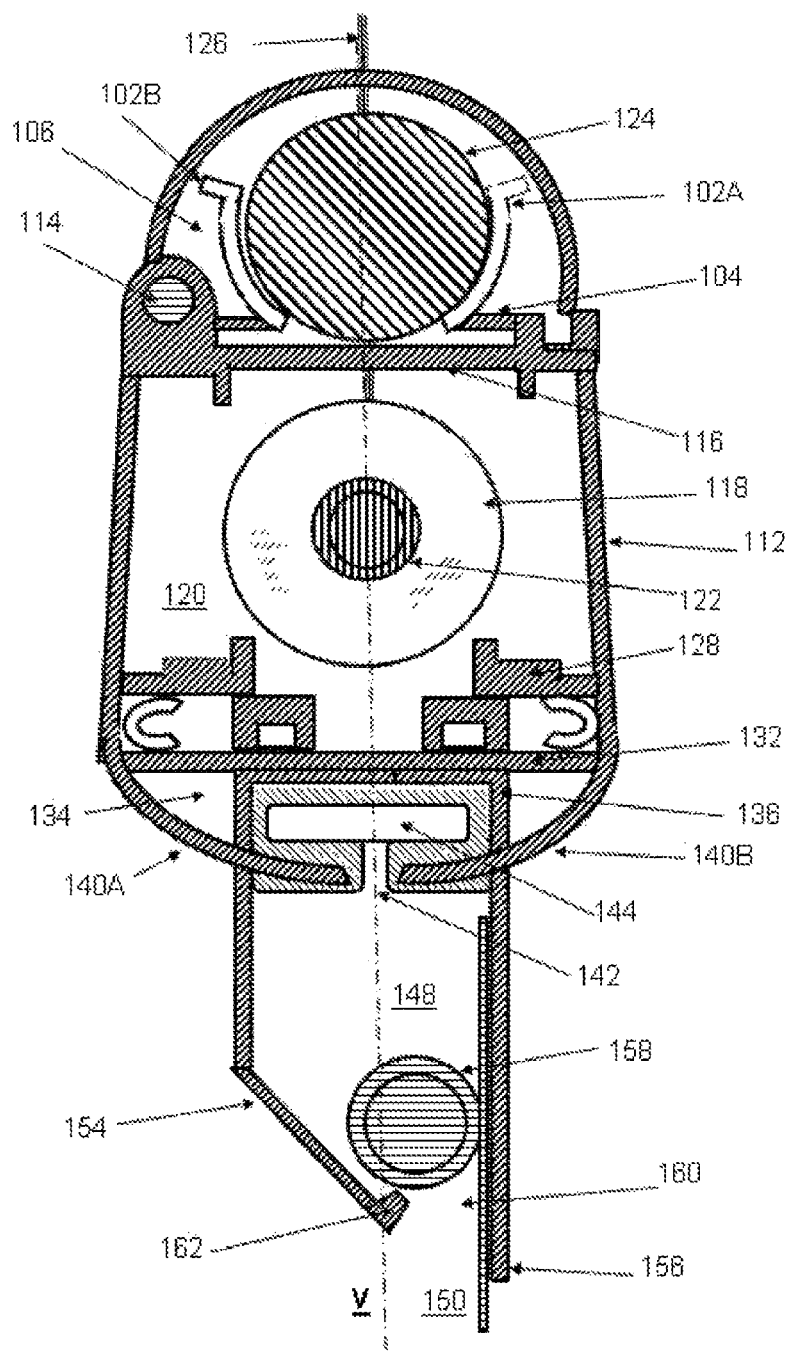
FIG. 3 illustrates schematically an inventive retention assembly used in the preferred embodiment of FIGS. 1 and 2.

FIG. 3 provides a cross-sectional end view of a further alternative embodiment of the disclosure, in which the battery pack 124 is located in the uppermost section of the housing 112. The batteries of the pack are held in position in a cradle defined by splayed resilient plastic gripping tabs 102A, 102B, attached to projections 104, which are moulded to be integrated with the housing body. The cavity 106 in which the battery pack cradle is housed, is accessible via a hinged, arcuately-profiled, openable cover 108, which is pivotally connected to housing 12 by a hinge mechanism 114.

A horizontally-extending bulkhead 116 separates battery cavity 106 from the compartment 120 beneath, in which the motor (not shown) and cord take-up spool 118 are located. The spool is fixed to rotatable shaft 122, which is driven by the motor as previously mentioned. Cord 126 is shown extending upwardly to the securing points on the supporting structure, neither of which is shown in this diagram.

The motor is mounted on stepped brackets 128. Below a lower bulkhead piece 132 is a lower cavy 134 in which the upper frame portion 136 of the poster sheet gripping assembly is supported. The upper frame portion is fixed against the horizontal bulkhead by a set of opposing elongate curved arm portions 140A, 140B, integrally moulded with body 112. The arms pass through slots in frame portion 136 and between their ends define a throat 142. The throat leads to an inner space 144 into which an edge of a poster sheet 150 may pass to be accommodated.

Frame 136 extends to a lower portion made up of opposed free-edged sides 154, 156, between which a primary poster-receiving space 148 is defined. The poster portion received into the space enters through a gap 160 defined between the downwardly depending sides 154, 156. The gap is guarded by rolling round-cylindrical silicone coated rod 158. The rod is sufficiently weighted always to seek the lowest orientation in space 148, under influence of gravity, depending on the angle of inclination of the unit, from central vertical axis V. Weighting for the rod results from a core of a high density polymer or rubber, or a metal such as iron or a stainless steel.

Rod 158 is prevented from getting stuck in gap 160, not only by the relative smaller size of the gap compared with the rod diameter, but also by extending lip 162, at which edge 154 terminates. The contact between rod surface and lip disinclines the rod to roll and release the received poster portion when the poster is subjected to breezes.

To feed an edge of a poster 150 into space 148 for retention, the user will push body 112 so that the suspended unit moves away from its vertical orientation to the extent that rod 158 rolls to be displaced a small distance from its gap-sealing default position shown in FIG. 3. The user is then more easily able to insert the poster edge between rod 158 and either of the sides 154, 156. The unit is permitted to return to default position trapping the inserted poster portion in the space and being held against extraction under gravity by rod 158 and lip 162, or alternatively in a pinch between rod 158 and side 156.

Instead of jaws, the mechanism for holding the poster or other sheet to the suspended unit may involve other means, such as slideable rails or mating formations.

Figure 4:
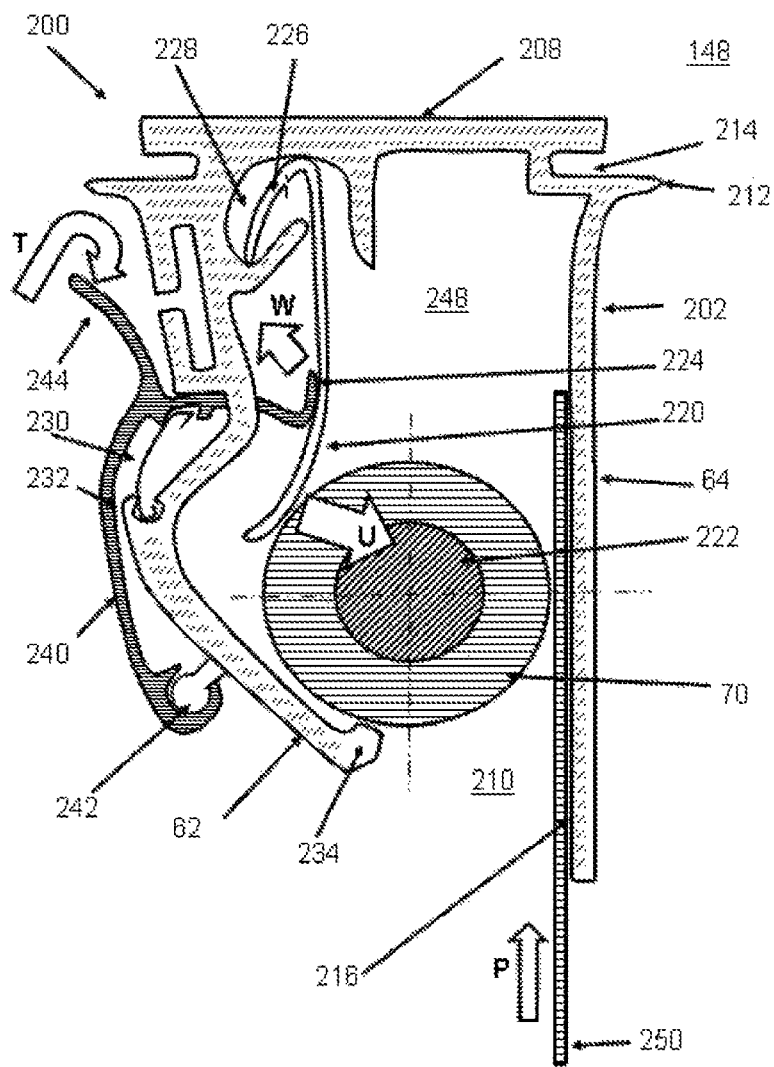
FIG. 4 is an end-on axial cross-section of a schematic representation of the poster holding subassembly of the disclosure, according to an embodiment.

FIG. 4 provides a cross-sectional end view of a poster-gripping subassembly for attachment to a housing in replacement of hull subassembly 14 shown in FIGS. 1 and 2. It may also replace the subassembly connected below bulkhead 132 in FIG. 3. In this alternative embodiment, a poster to be suspended is releasably clamped within a holding space of the kind described above. The clamping mechanism is releasable by human intervention when the unit has been lowered to a reachable elevation.

The subassembly, generally denoted by the integer 200, comprises a moulded wall 202 configured to define an internal space 248. The wall comprises a generally planar vertical side 64, an opposite profiled side 62 and a cover 208 extending between the two sides. The opposite sides do not meet, but define a gap 210 between them, into which a display sheet 250 is insertable, in the direction of arrow P.

The cover is connectable by fixing means of conventional type to the lower surface of a bulkhead, bracket, cradle or similar structure, such as bulkhead 132 in FIG. 3. The fixing means may be an adhesive, but is preferably a mechanical fixing means such as a nut and bolt combination. In this embodiment, side formations comprising rail projections 212 and recessed grooves 214 are provided for being received in mating engagement with complemental formations on an upper subassembly with which it is designed to connect.

Wall side 64 is substantially planar but may be curved. It preferably has a substantially smooth or at least consistent surface finish. However, it is within the scope of the disclosure that the surface may be adapted to have a desired degree of roughness for assistance in establishing a friction grip with a portion of a poster or other display sheet 150 that is inserted into space 148 through a gap. The roughness may be imparted by providing the surface with a series of ridges and grooves in a generally horizontal direction from end to end. Alternatively, the inner surface 216 of wall 64 may be coated with a layer of non-slip sheeting, such as a silicone film.

Within space 248 is an elongate roller 222, about which is installed a non-slip tubular layer of silicone 70, rendering it suitable for maintaining non-sliding contact with a variety of sheet materials used in the manufacture of suspended display sheets, such as plasticised paper or cardboard. Roller 222 is not axially fixed within space 248, but is free to roll up and down against wall surface 216, were it not for a substantially rigid arrestor leaf 220, which is urged against roller tubing 70 by means of a rigid, spring-loaded part 224, in the general direction shown by arrow U, towards wall side 64. Arrestor leaf 220, because of the action of part 224, functions to force outer tube 70 of roller 222 against display sheet 250 and against wall 64. A protruding lip 234 at the free end of wall side 62 is shaped for ensuring that roller 222 and tube 70 cannot pass through gap 210, but remain within space 248.

The roller functions to trap sheet 250 between it and wall side 64 by rolling in an anticlockwise manner when the display sheet is pushed edgewise into gap 210 and finding the extended downwardly directed surface leading to the lower end of wall side 64. The presence of lip portion 234 on the opposite wall and the positioning of the roller make insertion of display sheet 250 more easily achieved against wall side 64 than the alternative of attempting to force it between roller and lip 234.

A looped upper end 226 of leaf 220 is pivotally engaged in a socket 228 in the lower side of cover 208. Its free lower end bears against roller tube 70. A coiled spring 230, the coiled end of which is nested in socket 232, which is formed in a curve in the mid-portion of side wall 62, serves to maintain upward force against latch body 240. This force causes part 224 of lever latch 240 to maintains pressure against roller tube 70, preventing it from breaking trapping and holding contact with display sheet 250.

For breaking this trapping contact, a release mechanism is provided in the form of lever latch 240, which has a first end pivotally connected to wall side 62 at projection 242. A lever, at second, remote end 244 is shaped to be drawn back and away from wall side 62, in the direction of arrow T, by the thumb of a human operator, against the bias of spring 230. When so drawn back, the part 224 is pivoted upwards and away from leaf 220, as shown by directional arrow W. This allows leaf 220 to release its pressure on and hold of roller tube 70. In turn, roller tube releases sheet 250 from entrapment between it and wall surface 216, allowing sheet 250 to be drawn out of space 248, through gap 210, to be liberated. A replacement sheet is then installed to replace it. Of course, if display sheet is heavy enough, it will be able to slide out from its trapped position, as soon as lever 244 is drawn back.

As suggested earlier, wall side 64 may be of a curved profile, provided it is sufficiently complemental to the shape of roller tube 70 and supporting roller 222, when viewed axially. Therefore, wall side 64 may be made to curve inwardly with respect to space 248. It may also be curved outwardly, or have a profile of a generally reversed S-shape, while retaining the roller assembly within the internal space and able to rest against the wall side's inner surface above the gap.

Further, in an embodiment, the unit is configured so that the lower subassembly for releasably holding the display, is elongated to cater for a range of possible display poster widths, whereas the subassembly housing the motor and battery pack is of shorter lateral dimensions, sufficient for housing the greater of the battery pack length and the width of the cord-winders and motor when arranged in line.

It will be appreciated that different pairings of motors and power sources may be utilised according to the load to be lifted. This enables the apparatus to be used for lifting a wide range of articles of planar form for display, as well as non-planar articles that have suitable formations for gripping by the retention assembly of the system. Cords of different materials, appearances and strengths may be selected according to the weight of the article to be suspended and the performance capability of the motor and power source pairings.

An advantage of the system of this disclosure is that in providing separate cords, the risk of cord breakage or failure is halved, compared with a single cord loop in prior apparatus. If either of the cords breaks, the worst that can happen is that the poster holding unit will swing downwardly from its freed end while being held on the remaining cord, but will not drop on to passers-by below to cause injury. The flapping of the poster or other display item held will attract attention in a safe way, enabling the unit to be lowered and the cord replaced so that the unit can be put back into service. Were the unit to fall to ground, the risk of its being damaged inoperably is far greater.

These embodiments merely illustrate some examples of the system, method and apparatus providing for a remotely controllable motorized sheet display positioning and hanging unit in relation to a supporting structure. With the insight gained from this disclosure, the person skilled in the art is well placed to discern further embodiments by means of which to put the claimed disclosure into practice.

The invention claimed is:

1. A display hanging system comprising:
   a. a suspensible unit comprising a housing in which is contained a cord-winding mechanism including a single driving motor;
   b. wherein the housing being fixedly mounted on a display clamping assembly, by which a display sheet is able to be clamped, so that in use it hangs therefrom in display orientation;
   c. a pair of cords attached to the cord-winding means and arranged to suspend the unit from a support structure in operative orientation; and
   d. a remote control by which the cord-winding means is operable for releasing and winding each cord at least partially from and into the unit;
   wherein the display clamping assembly comprises:
      i. a space for receiving therein an edge-adjacent portion of a display sheet to be suspended, the space being bounded by a wall;
      ii. trapping means comprising a moveable body unsecured within the space, for trapping a display sheet portion when inserted into the space between the body and the wall, against removal; and
      iii. a releasing member operable to release the sheet portion from a trapping member for removal from the space, the releasing member acts on the urging part to reduce the force it applies against the trapped display sheet.

2. The display hanging system according to claim 1, wherein the trapping means comprises an urging part configured to force the body constantly against the sheet portion when interposed, and urge it against the wall, to resist withdrawal from entrapment within the space.

3. The display hanging system according to claim 2, wherein the body comprises a roller.

4. The display hanging system according to claim 3, having a roll-inhibiting formation against which the roller comes to bear when operatively trapping the received sheet.

* * * * *